Figure 1:
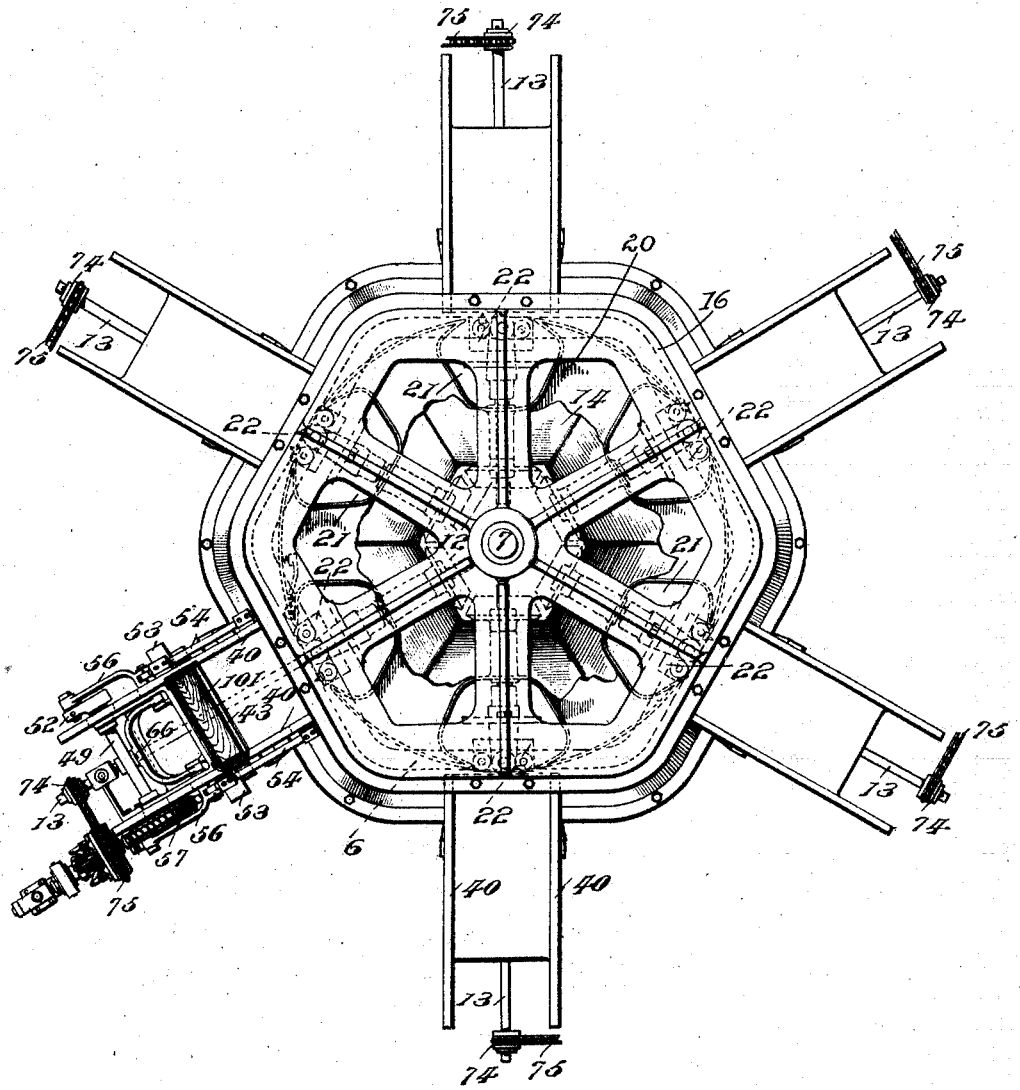

No. 764,492. PATENTED JULY 5, 1904.
W. H. NIEMEYER & E. J. GODMAN.
MACHINE FOR MAKING EXCELSIOR.
APPLICATION FILED DEC. 31, 1903.
NO MODEL. 9 SHEETS—SHEET 3.

Witnesses
W. A. Williams.
Wm. B. Kerkam.

Inventors
William H. Niemeyer,
Emory J. Godman,
Mauro, Cameron, Lewis & Massie
Attorneys.

No. 764,492. PATENTED JULY 5, 1904.
W. H. NIEMEYER & E. J. GODMAN.
MACHINE FOR MAKING EXCELSIOR.
APPLICATION FILED DEC. 31, 1903.
NO MODEL. 9 SHEETS—SHEET 4.

No. 764,492. PATENTED JULY 5, 1904.
W. H. NIEMEYER & E. J. GODMAN.
MACHINE FOR MAKING EXCELSIOR.
APPLICATION FILED DEC. 31, 1903.
NO MODEL. 9 SHEETS—SHEET 6.

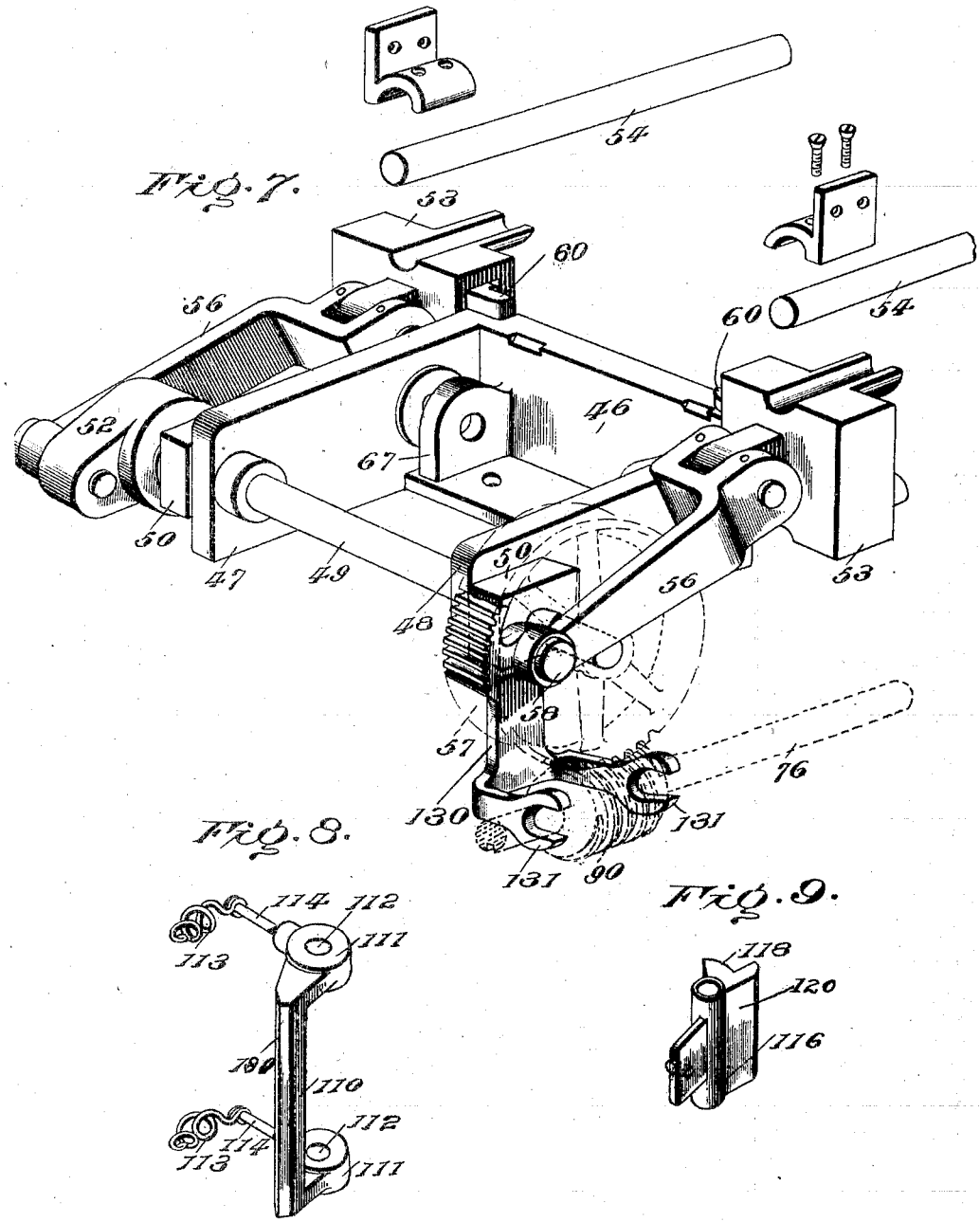

No. 764,492. PATENTED JULY 5, 1904.
W. H. NIEMEYER & E. J. GODMAN.
MACHINE FOR MAKING EXCELSIOR.
APPLICATION FILED DEC. 31, 1903.
NO MODEL. 9 SHEETS—SHEET 8.
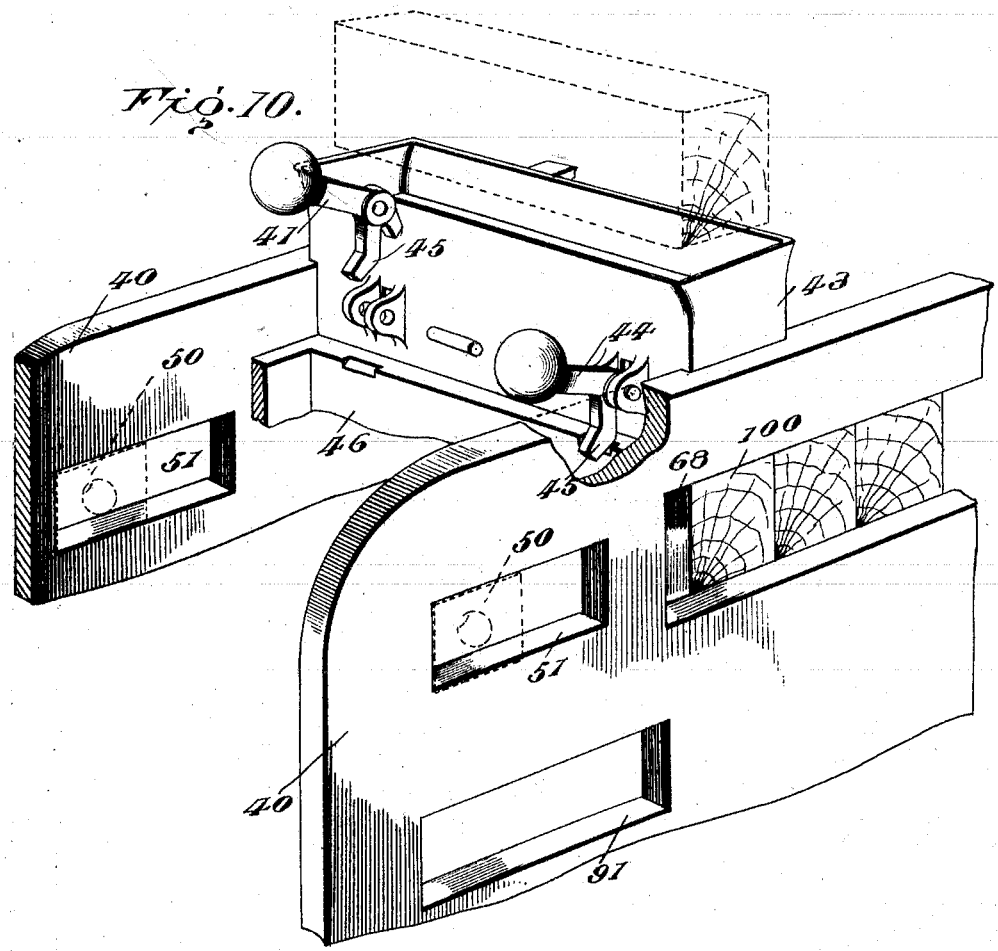
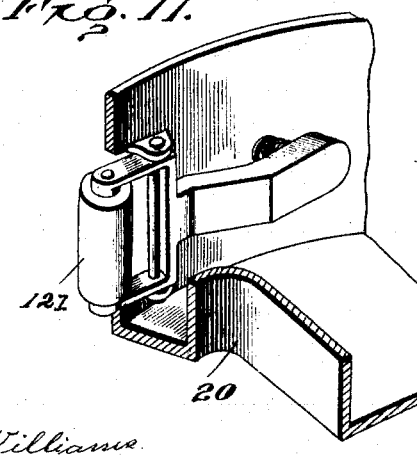
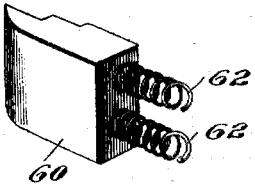

No. 764,492. PATENTED JULY 5, 1904.
W. H. NIEMEYER & E. J. GODMAN.
MACHINE FOR MAKING EXCELSIOR.
APPLICATION FILED DEC. 31, 1903.
NO MODEL. 9 SHEETS—SHEET 9.
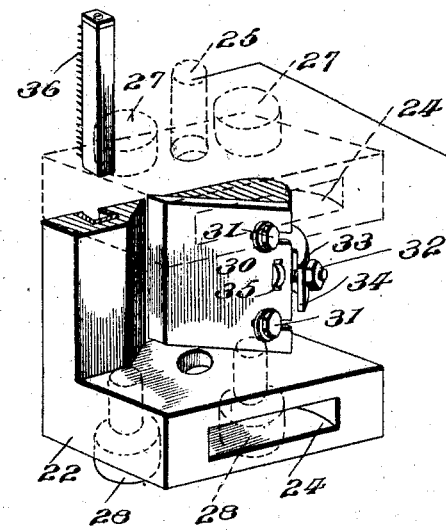
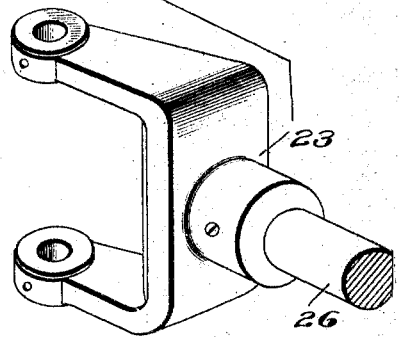
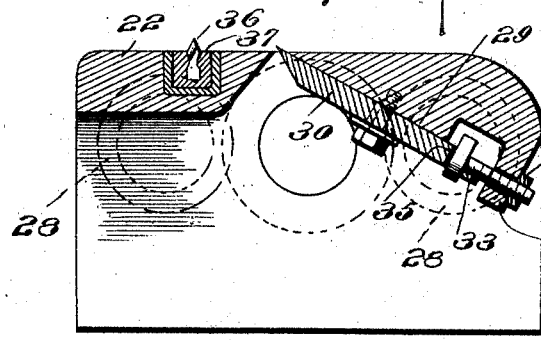
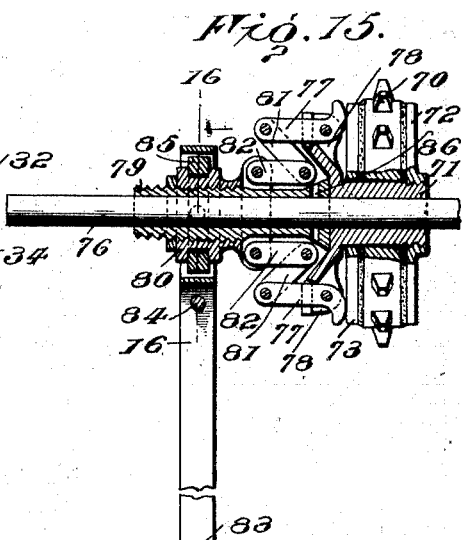
Witnesses
Inventors:
William H. Niemeyer
Emory J. Godman
By Mauro, Cameron, Lewis Massie,
Attorney No. 764,492. Patented July 5, 1904.

UNITED STATES PATENT OFFICE.

WILLIAM H. NIEMEYER AND EMORY J. GODMAN, OF BALTIMORE, MARYLAND, ASSIGNORS OF ONE-THIRD TO WILLIAM D. COLT, OF WASHINGTON, DISTRICT OF COLUMBIA.

MACHINE FOR MAKING EXCELSIOR.

SPECIFICATION forming part of Letters Patent No. 764,492, dated July 5, 1904.

Application filed December 31, 1903. Serial No. 187,297. (No model.)

*To all whom it may concern:*

Be it known that we, WILLIAM H. NIEMEYER and EMORY J. GODMAN, of Baltimore, Maryland, have invented a new and useful Machine for Making Excelsior, which invention is fully set forth in the following specification.

This invention relates to machines for the manufacture of excelsior, the object being generally to provide a machine of large capacity and of simple and durable construction.

In excelsior-machines heretofore commonly used the scoring and cutting members are arranged on the flat face of a rotating carrier, provision being made to cause the scorer to travel in a straight line during a portion of the rotation of the carrier while acting on the wood from which the excelsior is formed.

In accordance with our invention a number of scorers and cutters are disposed at the periphery or edge of the rotating carrier, and a plurality of feed mechanisms are spaced about the carrier, so that each scorer and cutter while traveling in a straight line acts successively upon a number of wooden blocks during each complete rotation, thereby giving the machine a large producing capacity. This peripheral disposition of the scorers and cutters facilitates the employment of a larger number of cutters and feed mechanisms than is possible with cutters at the face of the carrier. It also affords convenience, compactness, stability, and ready accessibility to the mechanism as a whole.

The invention also embraces improved feed mechanism comprising means for exerting a constant feeding pressure upon the block being operated upon and for permitting the introduction of blocks into the feed mechanism without interrupting the feed. The feed mechanism also comprises means for firmly holding the wooden blocks in position, particularly after they have been reduced to minimum thickness, and for finally automatically ejecting the sliver or remnant of a block which can no longer be conveniently operated upon.

The invention also embraces many other features of improvement, as will be apparent from the following detailed description.

Figure 2:
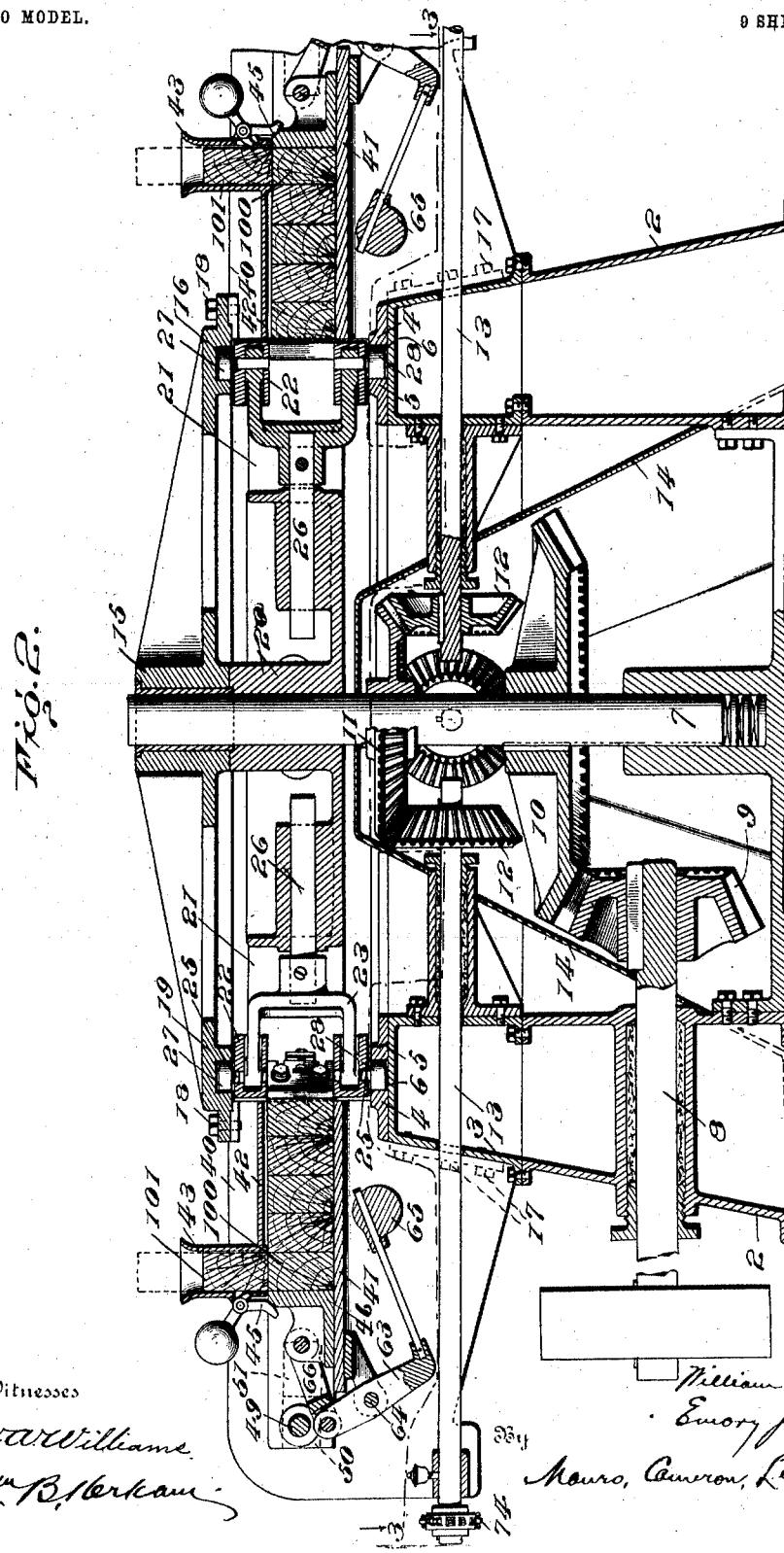
Figure 3:
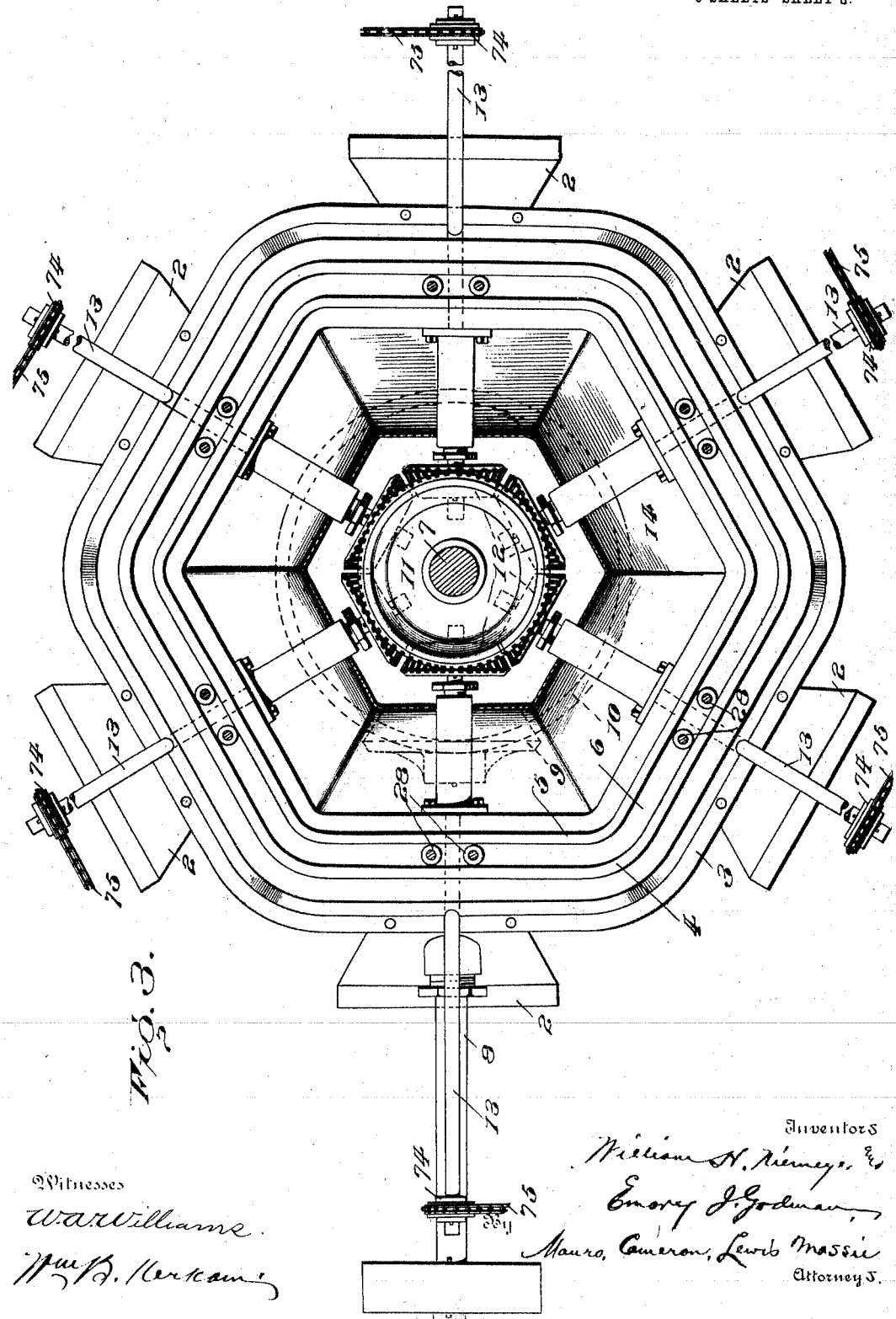
Figure 4:
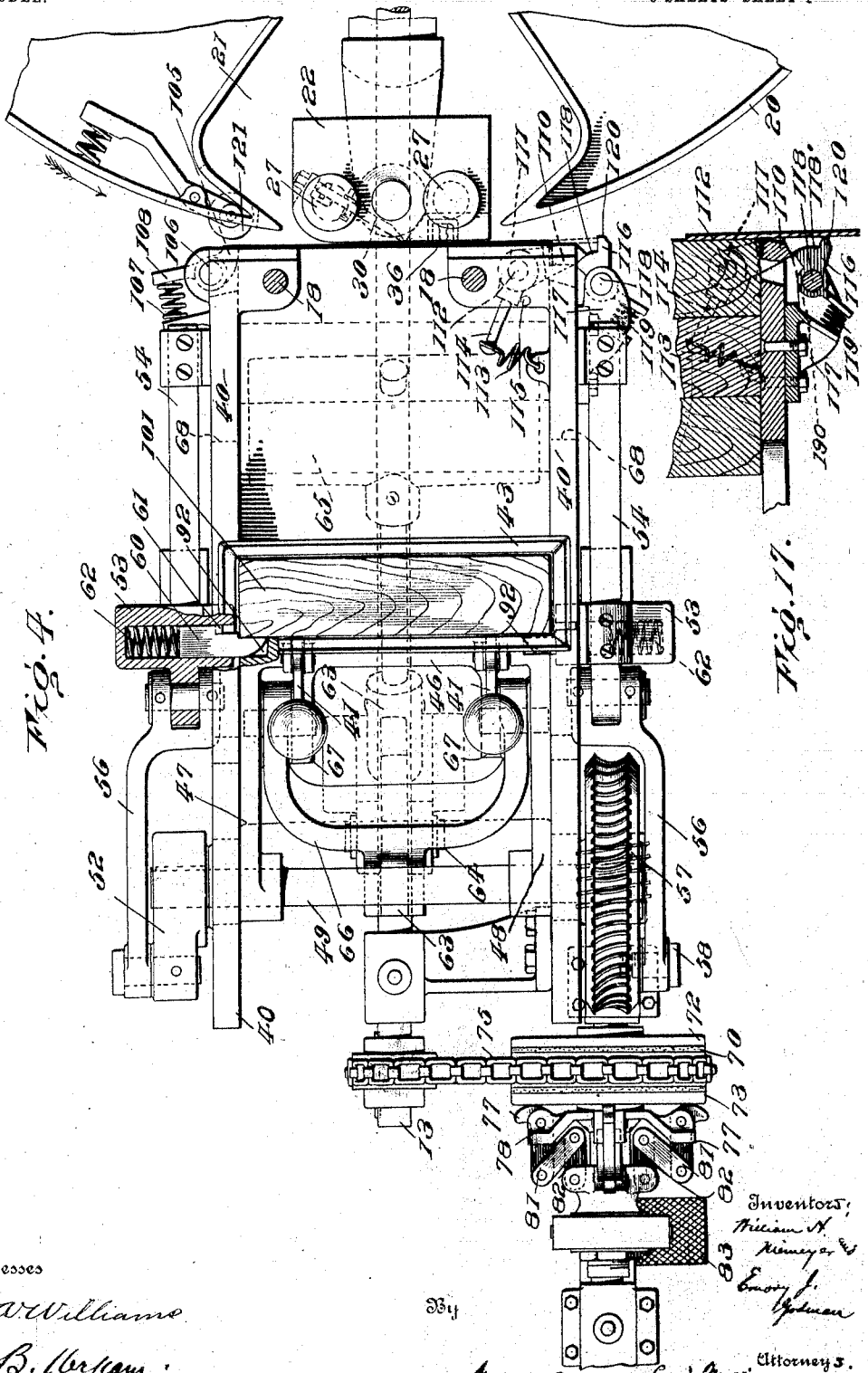

In the embodiment of the invention shown in the accompanying drawings, Figure 1 is a plan view, only one of the six feed mechanisms being shown and the carrier being broken away at its center to show the shield beneath. Fig. 2 is a transverse sectional view. Fig. 3 is a section plan view on the line 3 3, Fig. 2. Fig. 4 is a plan view, partly in section, Fig. 5 a side elevation, and Fig. 6 an end view, of one of the feed mechanisms. Figs. 7, 8, 9, 10, and 12 are detail perspective views of parts of the feed mechanism. Fig. 11 is a detail of part of the rotary carrier. Fig. 13 is a detail perspective view, partly in section, of a cutter-head and the fork in which it is pivoted. Fig. 14 is a sectional view of the cutter-head. Fig. 15 is a longitudinal section, and Fig. 16 a transverse section on the line 16 16, Fig. 15, of the clutch mechanism. Fig. 17 is a detail of part of the feed mechanism.

1 is the base-plate of the machine, which may rest upon the floor or upon a pedestal for giving the desired elevation.

2 represents a series of hollow posts secured at intervals about the edge of plate 1. In the machine illustrated there is a post under each of the six feed mechanisms.

3 is a continuous hexagonal frame supported upon posts 2, and 4 and 5 are concentrically-arranged hexagonal rings secured to the top face of the frame 3 in such manner as to provide between their opposing edges a hexagonal cam-raceway 6 with rounded corners.

7 is a vertical shaft supported at its lower end in the base-plate 1 and driven from the power-shaft 8 through bevel-gears 9 and 10, shaft 8 having bearings in one of the posts 2. A bevel-gear 11 on shaft 7 meshes with bevel-gears 12, one on the inner end of each of six shafts 13, through which the several feed mechanisms are operated, as will be hereinafter described.

14 is a hollow shield covering the gear-wheels above described. The excelsior removed by the cutters falls against said shield and in its delivery from the machine is deflected outwardly between the posts 2.

15 is the top plate of the machine, preferably of spider-like form, having a central hub connected with a rim 16 by radiating arms. Plate 15 is supported from frame 3 through the intermediary of each of the feed mechanisms, the framework of the latter being secured to frame 3 by bolts 17 and to a flange on plate 15 by bolts 18. (See Fig. 2.) The upper end of shaft 7 bears in the hub of plate 15. In the under face of the rim 16 of said plate is a hexagonal cam-raceway 19, similar to raceway 6, heretofore described. Fixed to the shaft 7 beneath plate 16 is a carrier 20 of peculiar outline. (Most clearly shown in Fig. 1.) It has about its edge six indentations or recesses 21, in which the cutter-heads 22 work. Each cutter-head is pivotally supported by a bifurcated member 23, the arms of which are pivoted in recesses 24 in the head (see Figs. 2 and 13) by pins 25. A radial stem 26 on member 23 is freely movable in carrier 20, thereby permitting the cutter-head to move toward and from the axis of rotation.

27 27 are small wheels at the upper side of the cutter-head engaging in the cam-raceway 19, and 28 28 are similar wheels at the under side of the head engaging in the cam-raceway 6.

From the preceding description it will be understood that in following the cam-groove the cutter-head will be oscillated on its pivots and also receive a radial movement toward and from the axis of rotation, these movements being necessary to enable the cutter-head to follow the straight portion of the grooves, and therefore to move in a straight line while a cut is being made.

Returning now to the construction of the cutter-head, 29 is an inclined surface against which the blade 30 is clamped in any desired position of adjustment by the bolts 31 31, Figs. 13 and 14. Upon loosening said bolts the blade may be adjusted by turning nut 32 on the end of a bolt 33, which passes through a lug 34. The head of the bolt loosely engages in a slot 35 in the blade.

36 represents scoring teeth or knives projecting from a bar 37, secured in a recess in the face of the cutter-head 22 in any suitable way.

We will next describe one of the feed mechanisms. The framework comprises two side plates 40, connected by plates 41 and 42, constituting the bottom and top walls, respectively, of a feed box or receptacle, the side walls of which are formed by said plates 40. (See Fig. 2.) Blocks of wood from which excelsior is to be formed are fed into the box through a hopper 43. Two weight-actuated clamps 44 44, pivoted between lugs on the hopper, project through openings in the wall thereof and bear against and grip the block in the hopper to prevent it from descending into the feed-box until the proper time. A trip-arm 45, Figs. 2 and 10, on each clamp is engaged by the feed-slide, hereinafter described, to automatically release the clamps. The feed-slide just referred to, which rests and slides upon the bottom 41 of the feed-box between the plates 40 40, comprises an end plate or wall 46, connecting two side walls or plates 47 48.

49 is a transverse shaft having bearings in said side walls 47 48 and also in rectangular bearing-blocks 50 50, each movable in an opening 51 in one of the plates 40. At one end shaft 49 carries a crank 52, connected by a pitman 56 to a pusher-slide 53, grooved at its top and bottom for engagement with rods 54 and 55, between which it reciprocates. At its other end shaft 49 carries a worm-wheel 57, having a crank-pin 58, connected by a second pitman 56 to a second pusher-block 53, also adapted to reciprocate between two rods 54 and 55. In each pusher-slide is a pusher 60, (see Figs. 4, 7, and 12,) normally held against a stop-pin 61 and projected from its slide through an elongated opening 68 in plate 40 by the action of two springs 62 62.

Figure 5:
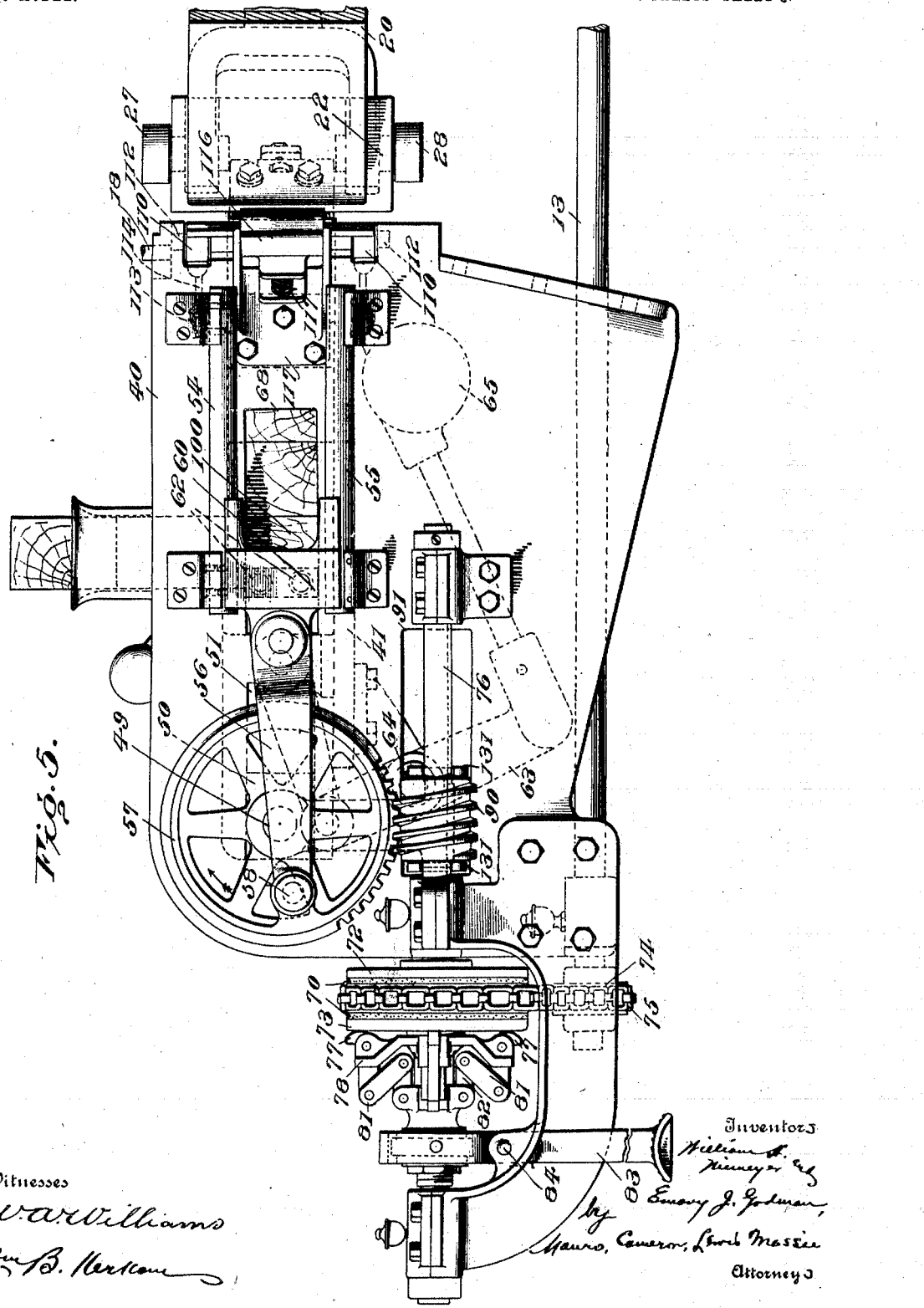
Figure 6:
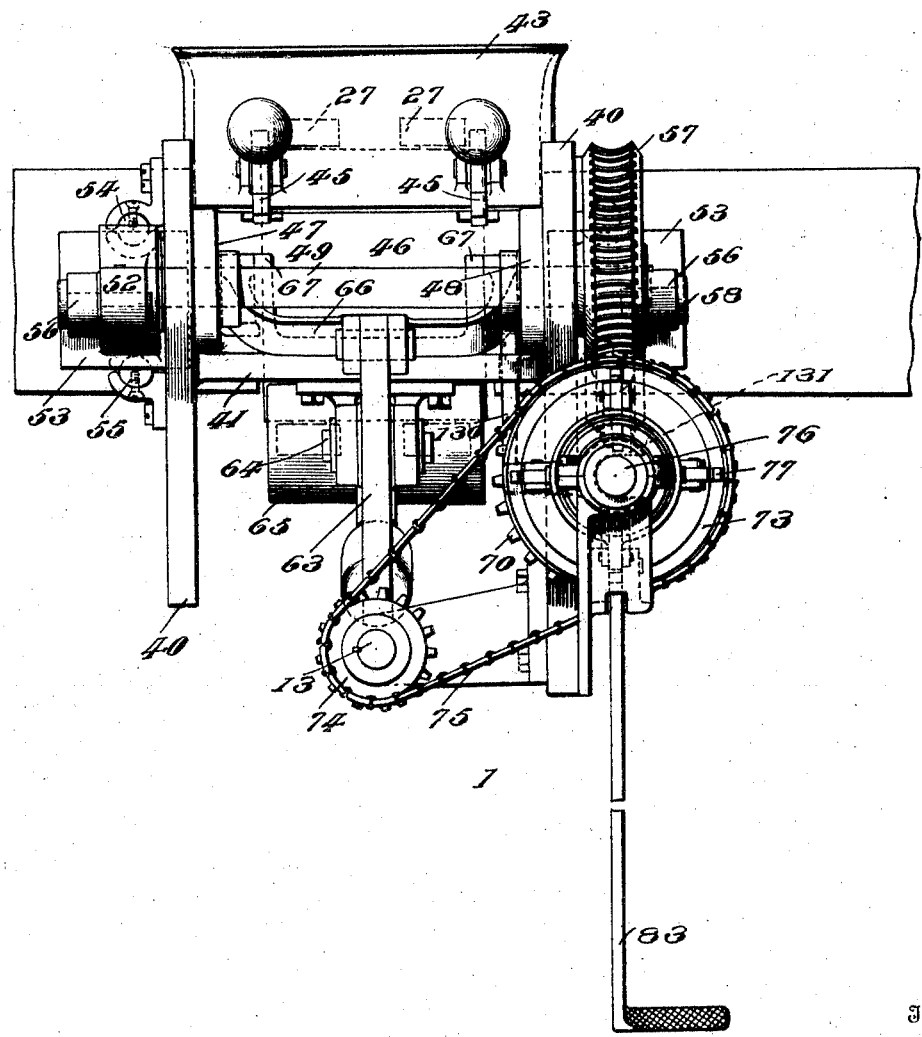

63 is a rock-arm fulcrumed at 64 in a bracket on the under side of plate 41, Figs. 2 and 5. At its lower end said arm has an angular extension carrying a weight 65. Its upper end is connected with the feed-slide by a bifurcated pitman 66, each arm of which is pivoted to the slide between one of its side walls and a lug 67.

70 is a sprocket-wheel adapted to turn loosely on a sleeve 71, Fig. 15, between a fixed disk 72 and a movable disk 73, both on the sleeve. 74 is a sprocket-wheel on shaft 13, from which sprocket-wheel 73 is continuously driven by a sprocket-chain 75. Upon applying pressure against disk 73 the sprocket 70 is gripped between the disks, causing them to rotate and impart movement to an auxiliary shaft 76, to which sleeve 71 is secured. Pressure may be applied against disk 73 by levers 77, each fulcrumed in an arm 78 on sleeve 71. 79 is a second screw-threaded sleeve loose on shaft 76 and surrounded by a third sleeve 80, screw-threaded thereon and connected with each lever 77 through two links 81 and 82. A clutch-operating treadle or lever 83, fulcrumed at 84, is pivotally connected with a ring 85, which loosely engages a groove in sleeve 80. As will be apparent, movement of lever 83 in one direction sets the clutch to drive shaft 76 and in the other direction releases the clutch. The parts may be adjusted to hasten or retard the clutch action or to compensate for wear by turning sleeve 79 by means of a pin or other suitable implement (not shown) inserted in holes 86, Fig. 15, thereby moving sleeve 80 by reason of its screw-threaded connection with sleeve 79.

A worm 90, splined on shaft 76, so as to be rotatable therewith but longitudinally movable thereon, imparts rotary motion to worm-wheel 57. The worm 90 is caused to follow the movement of the feed-slide and to always maintain proper operative engagement with the worm-wheel 57 through the medium of a bar 130, Figs. 5, 6, and 7, depending from the inner face of plate 48 and carrying at its lower end two arms 131 131, projecting through an opening 91 in plate 40, each arm being forked at its outer end to embrace shaft 76 at opposite ends of worm 90, as clearly shown in Figs. 5 and 7. An opening 91 is made in plate 40 to accommodate the worm.

The operation of the feed mechanism as thus far described is as follows: In the position of the parts shown in Figs. 2, 4, and 5 the pushers 60 60 rest in notches 92 92, Fig. 4, in plate 46 of the feed-slide and behind the outermost block 100 in the feed-box. Pressure is now applied to the blocks, and has been so applied during the receding movement of the pushers, by the feed-slide actuated by the weight 65. The feeding pressure is thus applied by the feed-slide until the crank-pins again begin their forward movement in the direction of the arrow, Fig. 5, whereupon the power transmitted from shaft 76 through the worm, worm-wheel, shaft 49, the crank-pins, and pitmen moves the pushers forward, causing them to exert feeding pressure upon the blocks. Simultaneously with the commencement of the forward movement of the crank-pins the power applied through the worm and worm-wheel imparts a short receding movement to the feed-slide and the parts connected therewith (overcoming the power of the weight 65) until the blocks 50 reach the outer ends of slots 51. The shaft 49 thus becomes the fixed point, from which power is applied to the pushers through the crank-pins and pitmen. If the power applied to the pushers tends to advance them more rapidly than the blocks are cut away, the contacting surfaces of the friction-clutch will slip. The forward movement of the pushers continues until the crank-pins are at the limit of their forward movement. The feed-slide in its rearward movement has engaged the trip-arms 45, thereby releasing the clamps and permitting another block to drop from the hopper into the feed-box in front of the slide. Simultaneously with the commencement of the backward movement of the crank-pins, and consequently of the pushers, the pressure of which upon the blocks is therefore removed, the weight acts to impel the feed-slide forward, only a slight movement being necessary to bring the new block inserted into contact with the block next to it in the feed-box, the pushers being forced back into their recesses in the slides 53 by the action of the block last inserted against the inclined rear faces of the pushers. Upon arriving at the limit of their receding movement the pushers are forced outward by their springs into the notches 92 behind the block last admitted and the operation above explained is repeated.

The backward movement of the pushers will be much more rapid than their advance movement, for the reason that during this period of the operation the power transmitted through the worm and worm-wheel acts without other opposition simply to impart said backward movement to the pushers. Hence there will be no slipping of the friction-surfaces of the clutch. It follows that the weight and feed-slide are relied upon to exert feeding pressure for only a relatively short period, while the feeding pressure is not being applied through the pushers actuated by the power mechanism. From this description it will be understood that continuous or practically continuous pressure is applied to feed the blocks to the scorers and cutters notwithstanding the introduction of more blocks into the feed-box effected without interruption in the operation of the feed mechanism. This constitutes an important factor in enabling us to provide a machine of unusually large capacity.

We will next describe means for firmly holding the blocks at the delivery end of the feed-box and for automatically ejecting the sliver or remnant of each block after it has been reduced to minimum thickness.

Referring to Fig. 4, 105 is a presser-foot mounted on an axis 106 and actuated by a spring 107, bearing against arm 108 to cause the presser-foot to bear tightly against the end surface of the block at the delivery end of the feed-box. The mechanism for effecting or facilitating the ejectment of slivers or remnants is located at the other side of the feed-box. 110 is a bar which when in normal position, Fig. 4, constitutes a part or extension of the side wall of the feed-box. Arms 111, Fig. 8, at opposite ends of the bar are pivoted at 112 to the feed-mechanism framework above and below the top and bottom walls of the feed-box. Springs 113, connected to projecting pins 114, tend to hold the bar in its normal position, movement being limited by stop-pin 115, Fig. 4. The bar is locked in this position by a bolt 116, Fig. 9, pivoted in a bracket 117 by a pin 118. A spring 119 tends to normally hold the swinging bolt in locking position, with its slightly-convex surface 118' opposed to the correspondingly concave surface 190 of the bolt, as shown in Fig. 4. 120 is a projecting lip on the bolt. The operation of these parts is as follows: When a block of wood at the delivery-opening of the feed-box has been reduced to a sliver of minimum thickness, the engagement of scoring-teeth and a cutting-blade therewith will impart to it a longitudinal movement, causing it to move past the bar 110 and into contact with lip 120, as indicated in dotted lines, Fig. 4. The bolt 116 is swung on its pivot out of locking position, and the pressure of the sliver against the bar 110 swings the same to the position shown in Fig. 17, so that further movement will readily eject the sliver without danger of choking the mechanism.

A spring-actuated roller 121, Figs. 4 and 11, mounted in the carrier 20 at one edge of each recess 21 thereon, is adapted to bear against the block following the knife, thereby preventing tilting or displacement of the block, particularly while the scorers and cutter near the end of the block.

While we have illustrated the carrier as rotating in a horizontal position, it is evident that it may operate in any other desired position. Furthermore, the arrangement of the scorers and cutters may be changed as desired.

The term "block feed-box" or "receptacle" as herein employed is intended to comprehend any suitable arrangement of guiding-plates or framework more or less open at the sides. Many other modifications may be made without departing from the spirit of the invention.

What is claimed is—

1. In a machine for cutting excelsior, a rotary carrier, a cutting-blade on the carrier with its cutting edge projecting from the periphery thereof, said blade being movable on the carrier toward and from the axis of rotation thereof, a feed-box adjacent to the carrier, and means for imparting straight-line movement to the blade as it passes the feed-box.

2. In a machine for cutting excelsior, a rotary carrier, a scorer on the carrier with its cutting edge projecting from the periphery thereof, said scorer being movable on the carrier toward and from the axis of rotation thereof, a feed-box adjacent to the carrier, and means for imparting straight-line movement to the scorer as it passes the feed-box.

3. In a machine for cutting excelsior, a rotary carrier, a cutting-blade thereon movable toward and from the axis of rotation of the carrier, and a feed-box adjacent to the carrier in which material to be acted upon is adapted to be fed toward the axis of the carrier into contact with the cutting edge of the blade, and means for imparting straight-line movement to the blade as it passes said feed-box.

4. In a machine for cutting excelsior, a rotary carrier, a scorer thereon movable toward and from the axis of rotation of the carrier, and a feed-box adjacent to the carrier in which material to be acted upon is adapted to be fed toward the axis of the carrier into contact with the cutting edge of the scorer, and means for imparting straight-line movement to the scorer as it passes said feed-box.

5. In a machine for cutting excelsior, a rotary carrier, a cutting-blade thereon movable toward and from the axis of rotation of the carrier, a plurality of feed-boxes spaced around the carrier in which material to be acted upon is adapted to be moved toward the axis of the carrier into contact with the cutting edge of the blade, and means for imparting straight-line movement to the blade as it passes each feed-box.

6. In a machine for cutting excelsior, a rotary carrier, a scorer thereon movable toward and from the axis of rotation of the carrier, a plurality of feed-boxes spaced around the carrier in which material to be acted upon is adapted to be moved toward the axis of the carrier into contact with the cutting edge of the scorer, and means for imparting straight-line movement to the scorer as it passes each feed-box.

7. In a machine for cutting excelsior, a rotary carrier, a scorer and a plurality of cutting-blades thereon and movable toward and from the axis of rotation of the carrier, a plurality of feed-boxes spaced around the carrier and in which material to be acted upon is adapted to be fed toward the axis of rotation of the carrier into contact with the cutting edges of the scorer and blades, and means for imparting straight-line movement to the scorer and each blade as they pass each feed-box.

8. In a machine for cutting excelsior, a rotary carrier, a scorer and a plurality of cutting-blades thereon and movable toward and from the axis of rotation of the carrier with their cutting edges projecting from the edge or periphery of the carrier, a plurality of block feed-boxes spaced around the carrier, and means for imparting straight-line movement to the scorer and each cutter as it passes each feed-box.

9. The combination of a rotary carrier, a cutting-blade thereon and movable toward and from the axis of rotation of the carrier, a plurality of feed-boxes spaced around the carrier and in which material to be acted upon is adapted to be fed toward the axis of rotation of the carrier and into contact with the cutting edge of the blade, and a continuous cam-raceway having straight portions for imparting straight-line movement to the cutting-blade as it passes each feed-box.

10. The combination of a rotary carrier, a scorer and a plurality of cutting-blades movable on the carrier toward and from its axis of rotation, a plurality of feed-boxes spaced around the carrier and in which material to be acted upon is adapted to be fed toward the axis of rotation of the cutter into contact with the cutting edges of the scorer and blades, and a continuous cam-raceway having straight portions for imparting straight-line movement to the scorer and each cutting-blade as they pass each feed-box.

11. The combination of a rotary carrier, slides or stems movable on the carrier toward and from its axis of rotation, oscillatory cutter-heads pivoted to the stems, a scorer and a plurality of cutting-blades on the cutter-heads, a plurality of feed-boxes spaced around the carrier, and guiding means imparting straight-line movement to each cutter-head as it passes each feed-box and incidentally moving the slides longitudinally and oscillating the cutter-heads on their pivots.

12. The combination of a rotary carrier, slides or stems movable on the carrier toward and from its axis of rotation, cutter-heads pivoted to the stems, a scorer and a plurality of cutting-blades on the cutter-heads, two rollers located one in advance of the other on each cutter-head, a plurality of feed-boxes spaced around the carrier, and a cam-raceway engaged by the rollers and having straight portions for imparting straight-line movement to each cutter-head as it passes each feed-box.

13. The combination of a rotary carrier having recesses or indentations at its edges or periphery, slides or stems movable on the carrier toward and from its axis of rotation, a plurality of cutter-heads pivoted to the slides respectively and one located in each of said recesses, a scorer and a plurality of cutting-blades on the cutter-heads, a plurality of feed-boxes spaced around the carrier, and guiding means imparting straight-line movement to each cutter-head as it passes each feed-box.

14. The combination with a cutter, of a feed box or receptacle, two feed elements adapted to bear against the rear face of blocks in the feed-box, and operating mechanism causing one element to exert feeding pressure upon the blocks to press them toward the cutter while causing the other element to make a receding movement, and vice versa, the receding movement imparted to one element being sufficient to permit the introduction of another block in front of said element.

15. The combination with a cutter, of a feed box or receptacle, two feed elements, operating mechanism causing one element to exert feeding pressure upon the blocks in the feed-box to press them toward the cutter while the other element makes a receding movement, and vice versa, and means actuated upon the receding movement of one element to charge the feed-box.

16. In feed mechanism of the kind described, a feed box or receptacle, a pusher and a feed-slide, means operating the slide to press upon the blocks while causing the pusher to recede and vice versa, clamping means for holding a block in position to be dropped into the feed-box, and clamp-releasing means actuated upon the receding movement of the feed-slide to drop a block into the feed-box in advance of said slide.

17. In feed mechanism of the kind described, a feed box or receptacle, a pusher and a feed-slide, a weight tending to advance the feed-slide, means for reciprocating the pusher and for imparting receding movement to the feed-slide.

18. In feed mechanism of the kind described, a feed box or receptacle, a pusher and a feed-slide, a weight tending to advance the feed-slide, a shaft journaled in the feed-slide, a crank-pin connected with the shaft and the pusher, and means for rotating the shaft.

19. In feed mechanism of the kind described, a feed box or receptacle, two pushers operating in opposite sides of the feed-box, a feed-slide, and means operating the slide to press upon the blocks while causing the pushers to recede, and vice versa.

20. In feed mechanism of the kind described, a feed box or receptacle, two pushers operating in opposite sides of the feed-box, a feed-slide, a weight tending to advance the feed-slide, a shaft journaled in the feed-slide, two crank-pins connected with the shaft and the pushers, and means for rotating the shaft, whereby the slide presses upon the blocks while the pushers recede, and vice versa.

21. In feed mechanism of the kind described, a feed box or receptacle, and a spring-actuated presser-foot bearing against one end of the block or blocks at the delivery end of the feed-box.

22. In feed mechanism of the kind described, a feed box or receptacle, a bar normally held in position to constitute a part or extension of one side wall of the feed-box at its delivery end and automatically movable to a position permitting ready ejectment of a block sliver or remnant by longitudinal movement of the latter, and locking means for securing the bar in its normal position but adapted to be automatically released to free the bar by partial ejectment of a sliver.

23. In feed mechanism of the kind described, a feed box or receptacle, a spring-actuated bar normally held in position to constitute a part or extension of one side wall of the feed-box at its delivery end and automatically movable against its actuating-spring pressure to a position permitting ready ejectment of a block sliver or remnant by longitudinal movement of the latter, spring-actuated locking means for securing the bar in its normal position but adapted to be automatically released to free the bar by partial ejectment of a sliver.

24. In a machine for cutting excelsior, a rotary carrier, a cutting-blade and a scorer thereon with their cutting edges in a plane parallel or approximately parallel to the axis of rotation of the carrier, the scorer being movable toward and from said axis, a plurality of feed-boxes spaced about the carrier, and means for imparting straight-line movement to the scorer as it passes each feed-box.

25. In a machine for cutting excelsior, a rotary carrier, cutting-blades and scorers on the carrier with their cutting edges in a plane parallel or approximately parallel to the axis of rotation of the carrier, the scorers being movable toward and from said axis, a plurality of feed-boxes spaced about the carrier, and means for imparting straight-line movement to each scorer as it passes each feed-box.

26. The combination with a cutter, of a feed box or receptacle, two feed elements, driving connections for reciprocating one element causing it in its forward movement to exert feeding pressure upon the blocks to press them toward the cutter and for imparting receding movement to the second element while the first element is advancing, and other actuating means causing the second element to press the blocks toward the cutter while the first element is receding.

27. The combination with a cutter, of a feed box or receptacle, two feed elements, driving connections for reciprocating one element causing it in its forward movement to exert feeding pressure upon the blocks to press them toward the cutter and for imparting receding movement to the second element while the first element is advancing, said driving connections comprising a friction-clutch through which power is transmitted, and other actuating means causing the second element to press the blocks toward the cutter while the first element is receding.

28. The combination with a cutter, of a feed box or receptacle, two feed elements, driving connections comprising a friction-clutch for reciprocating one element causing it in its forward movement to exert feeding pressure upon the blocks to press them toward the cutter and for imparting receding movement to the second element while the first element is advancing, and a weight acting upon the second element and causing it to press the blocks toward the cutter while the first element is receding.

In testimony whereof we have signed this specification in the presence of two subscribing witnesses.

WILLIAM H. NIEMEYER.
EMORY J. GODMAN.

Witnesses:
REEVE LEWIS,
WM. B. HERKAM.